TAPE SPLICING APPARATUS AND METHOD

Filed Jan. 31, 1962 3 Sheets-Sheet 1

C. L. SWEET
INVENTOR.

BY Ely Silverman
ATTORNEY

March 17, 1964 C. L. SWEET 3,125,632

TAPE SPLICING APPARATUS AND METHOD

Filed Jan. 31, 1962 3 Sheets-Sheet 2

C. L. SWEET

INVENTOR.

BY Ely Silverman

ATTORNEY

C. L. SWEET
INVENTOR.

BY Ely Silverman
ATTORNEY

United States Patent Office 3,125,632

Patented Mar. 17, 1964

3,125,632

TAPE SPLICING APPARATUS AND METHOD

Cary Lee Sweet, 3821 Van Buren, Amarillo, Tex.

Filed Jan. 31, 1962, Ser. No. 170,007

1 Claim. (Cl. 178—5.8)

This invention relates to a method and apparatus for splicing tape. More particularly, this invention is directed to a method and apparatus for splicing video tape.

Television studios are today often faced with the task of splicing several pre-recorded tapes together to make up special programs or splicing two or more commercials that are scheduled to be viewed in sequence. Developing, splicing, and cleaning of such tapes by conventional methods usually takes from 10 to 15 minutes per splice when using experienced personnel and even greater times are required by people not adequately trained. Also, when video tapes are spliced by conventional methods, a serious problem is that relating to cleaning the developing fluid off the tape after the splice is made. This is important because the developing fluid usually contains iron carbonyl and iron particles and the failure to clean the tape thoroughly will cause "drop-out" or even a complete loss of output, as such splice and the iron particles attached thereto pass over the head wheel of the video playback machine. Further still, frequently the iron particles of such fluid become imbedded between the poles of one of the heads and render the head wheel useless.

Such problems are nonexistent in the device of this invention because no developing of the tape is necessary.

Another problem arises where pre-recorded and spliced tape will play perfectly the first time but when recorded repeatedly there may be an excessive amount of "drop-out" where the splices are made because too much space is left between the ends of the tape where the splice is made. However, by the device of this invention splices are so properly made that tapes with such splices therein may be recorded over and over again and played back with no more drop-out than may be seen even on a new tape.

Thus, the device of this invention provides a ready method for splicing video tape quickly, easily, and accurately and the once tedious splicing job now requires only a minute or two. Also, the device of this invention provides for splicing video tapes so that such splice is invisible to the viewer.

One object of this invention is to provide an apparatus that is rugged in construction, reliable in operation, convenient and efficient in operation.

Yet another object of this invention is to provide a method of splicing video tape that is simple, reliable, extremely accurate, and rapid.

Other objects of this invention will be apparent to those skilled in the art on study of the description of the embodiment given in the specification herebelow of which specification the drawings attached hereto form a part, wherein like numbers refer to like parts in all figures and wherein.

Figure 1:
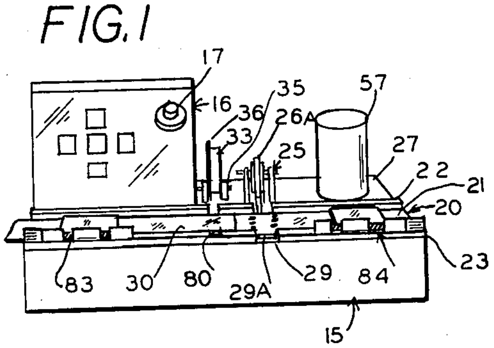
FIGURE 1 is a front perspective view of a preferred embodiment of the apparatus of this invention.

The device of this invention, in the preferred embodiment shown in the figures, generally comprises a hollow casing 15 on top of which is a perforated loud speaker cabinet 16, an on-off and volume control 17 for loud speaker 18, a track 20 for support of a conventional 2" wide video tape, 30, a tape cutting sub-assembly 33, and a tape splicing sub-assembly 25.

Figure 4:
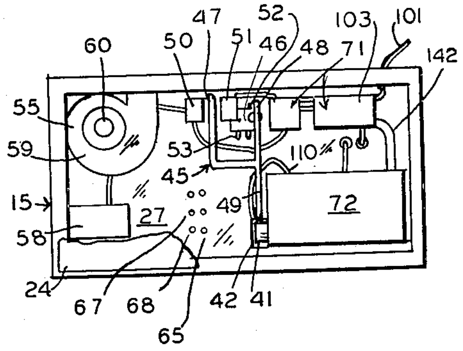
FIGURE 4 is a bottom view of the device of FIGURE 1.
Figure 5:
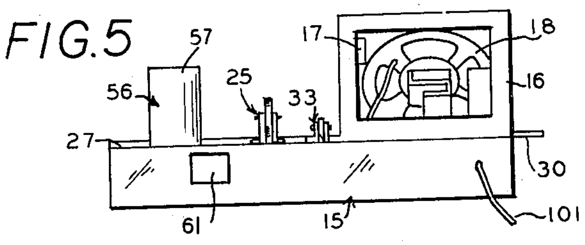
FIGURE 5 is a near view of the device shown in FIGURE 1.

The casing 15 is provided with a bottom 24, shown broken away in FIGURE 4, and various parts, below described, are located and operatively interconnected within the casing.

Casing 15 is made of 16 guage aluminum sheet and has outside dimensions of 13" length, 7" width and 1½" height.

Track 20 is formed from a grooved ½" x 3" x 13" aluminum bar and provides for support and longitudinal sliding transport of lengths of video tape as 30 and 31. It comprises a longitudinally elongated flat track surface 21, 2.003±.001" wide, bounded laterally by a pair of straight parallel right rectangular sectioned ¼" high guide shoulders 22 and 23. The splicing tape support sub-assembly 25 for splicing tape 26 is located on the top or roof surface 27 of the casing 15 adjacent track 20. Such splicing tape is in a roll of conventional splicing tape ¼" wide and .0007" thick, 26A. Splicing tape grooves 28 and 29, each 9/32" wide, are provided in shoulders 22 and 23 in line with the sub-assembly 25. These grooves are located to provide a path for the splicing tape 26, which path perpendicularly crosses the length of the track 20. These grooves in shoulders 22 and 23 extend downward to below the level of the track surface 21. Grooves 28 and 29 provide for application of the splicing tape 26 across the track surface 21 to the 2" wide video tape end portions 81 and 82 of tapes 30 and 31 while such tape portions are held to surface 21 between shoulders 22 and 23.

Cutting blade sub-assembly 33 is adjustably, yet firmly, supported by bracket 35 on surface 27 to one side of track 20. Sub-assembly 33 comprises a steel cutting blade 36 with a straight cutting edge 38 that is 2¼" long and pivotally supported at one end on a pivot 37 which is fixedly supported on bracket 35. Such cutting blade is arranged to completely cut a 2" tape, as 30, in a straight line at an angle 99 of 89°27′ to the length of such tape while the guide shoulders 22 and 23 laterally position such tape in position relative to the cutting blade 36. Suction means and mechanical means, below described in detail, provide for the controlled longitudinal location of such tape on track 20.

A tape recording head 41 is used as a sensing element in the device of this invention. It is located with its top surface 44 in window 42 in the track surface 21. A space, 43, is provided around the periphery of the head 41 between such head and the outline of such window for purposes of holding the video tape 30 against surface 21 and near the top of the head 41 by a vacuum as described in detail hereinbelow as well as to permit oscillation of the head parallel to the length of the shoulders 22 and 23.

The head 41 is mechanically mounted on a Y-shaped arm, shown generally as 45. The arm 45 is 5" long and 2" wide overall. It is made of flexible, resilient ⅛" x ½" steel and oscillatably supported by a bracket 46 on the roof or top surface 27 of casing 15. One branch arm 47 is located between two solenoids 50 and 51. The other branch arm 48 is attached to bracket 46. Base arm 49 supports head 41. Oscillation of the arms 47 and 49 at a fixed frequency of 60 cycles per second is provided by the 60 cycle current 101 acting on the circuit shown in FIGURE 7 and the consequent controlled oscillation of the head 41 in the window 42 at 60 cycles per second. The bracket 46 is adjustably mounted 1 inch from end of arm 48 to the top, 27, of the casing 15 as by elongated slots 52 and 53 in order to control the amplitude of vibration of the head 41 to an amplitude of .0006″ on each side of center of oscillation of head 41 in the preferred embodiment. As the arm 45 is made of relatively rigid material—⅛″ x ½″ steel—the frequency of vibration of this structure is readily controlled by the circuit of FIGURE 7 and position of bracket 46 on arm 48 and avoids any undesired resonant vibration of such arm and uncontrolled longitudinal motion of the head 41. The head 41 is adjustably, yet firmly, mounted on arm 49 so that the center plane 73A of gap 73 is normal to surface 21 and parallel to the blanking interval length on the tape 30 and distant from the plane of the cutting edge 38 of blade 36 by 0 (zero), 1, 2, 3, or other full integer multiple of the distance between the centers of blanking intervals on the tape 30 to be cut.

Figure 6:
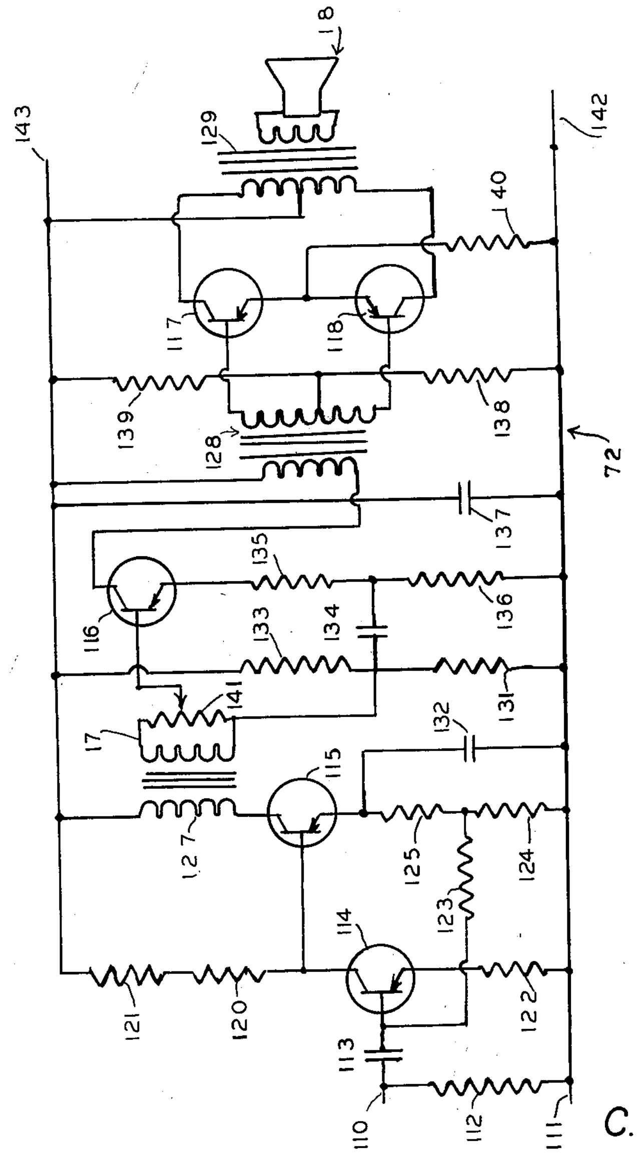
FIGURE 6 is a wiring diagram showing the electrical components of the amplifier generally shown as 72.
Figure 7:
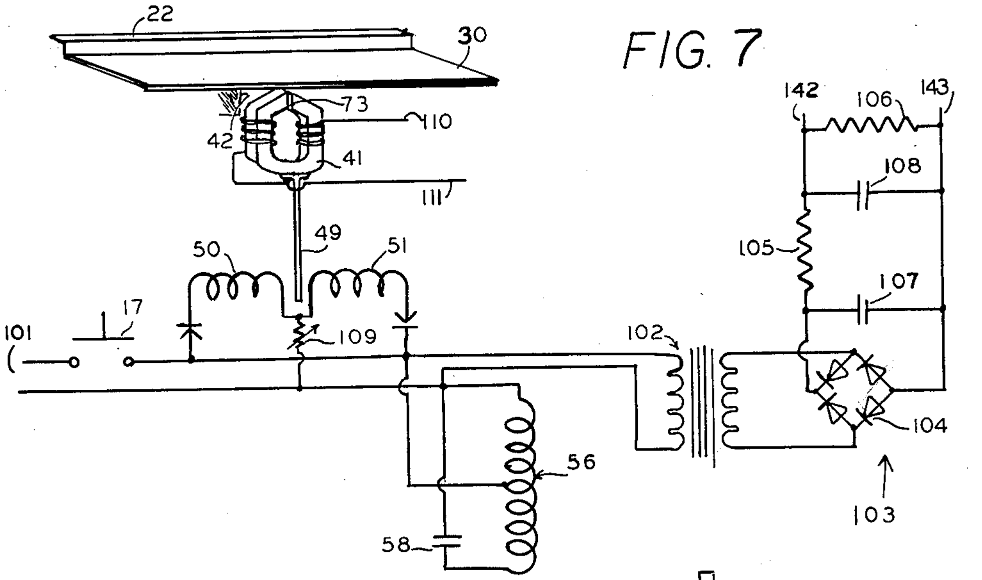
FIGURE 7 is a wiring diagram of the power circuit generally shown as zone 71 in FIGURE 4.

Oscillation of head 41 is accomplished by the pull-pull arrangement, as in FIGURE 7, of the two solenoids 50 and 51; such oscillation is adjusted as below described for an average head travel of 5 to 6 inches per minute with a swing of .0006″ of the center plane 73A of gap 73 from the center of oscillation of such plane to each side of such plane. A somewhat larger swing may be used without impairing the accuracy of the device since the speed of the head movement would be maximum through the center of its swing. The needed sensing discrimination for cutting through the center of the field pulse, as 76, and the associated blanking interval on the video track can be adjusted by varying the circuit 72. The circuit shown in FIGURES 6 and 7 of the preferred embodiment is that found most preferable for a head gap of .0005 inch and a swing of .0006 inch each side of the center of oscillation of gap 73 while locating the tape with such accuracy as to always cut through the center of a blanking interval. Transistorized amplifier 72 provides a 100 decibel gain at 120 cycles per second. In the preferred embodiment the components of the circuit shown in FIGURES 6 and 7 are as in Table I here below:

*Table I*

| Identifying Number | General Description | Value |
|---|---|---|
| 41 | Magnetic Head | .0005″ gap. |
| 50, 51 | Solenoid (#131277) | 500 ma. |
| 73 | Recorder Head (P. 465 Allied TR16J):<br>Gap width=.0005 inch.<br>Gap depth=.040–.050 inch.<br>Gap length=.010 inch. | |
| 101 | A.C. input | 110 v. |
| 102 | Transformer. | |
| 103 | Full Wave Bridge Rectifier and Filter. | |
| 104 | Rectifier | 250 ma. cap. at 24 v. |
| 105 | Resistance | 660 ohm. |
| 106 | do | 330 ohm. |
| 107 | Capacity | 100 mfd. |
| 108 | do | 100 mfd. |
| 109 | Variable Control Resistance | 1,650 ohm. |
| 110 | Audio Input Plug Terminal. | |
| 111 | Do. | |
| 112 | Resistance | 18,000 ohm. |
| 113 | Capacitance | 150 mfd./6 v. |
| | Germanium Transistors (type 2N185): | |
| 114 | Total Diss | 150 mw. |
| 115 | Max. Coll. line voltage open. input | 20 v. |
| 116 | Max. Collect current | 150 ma. |
| 117 | Small signal current gain | 60 min. and 150 max. |
| 118 | Coll. base cut off current | 15 microamp. at 20 v. |
| 120 | Resistance | 8,200 ohm. |
| 121 | Fine Adjustment Resistance | 330 ohm. |
| 122 | Resistance | 470 ohm. |
| 123 | do | 1,300 ohms. |
| 124 | do | 560 ohms. |
| 125 | do | 2,200 ohms. |
| 127 | Interstage Coupling Transistor Transformer DO–T1:<br>Primary<br>Secondary | <br>20–300,000 ohms.<br>800–1200 ohms. |

*Table I*—Continued

| Identifying Number | General Description | Value |
|---|---|---|
| 128 | Interstage coupling transistor Transformer, Type DO–T39:<br>Primary<br>Secondary | <br>2–2.5K CT.<br>8K–10K. |
| 129 | Audio Output Transformer Merit A2767. | 500:4. |
| 130 | Push-Pull Amplifier, generally. | |
| 131 | Resistance | 1,500 ohm. |
| 132 | Capacitance | 150 mfd./6 v. |
| 133 | Resistance | 8,200 ohms. |
| 134 | Capacitance | 150 mfd./6 v. |
| 135 | Resistance | 220 ohms. |
| 136 | do | 470 ohms. |
| 137 | Capacitator | 150 mfd./20 v. |
| 138 | Resistance | 56 ohms. |
| 139 | do | 6,800 ohms. |
| 140 | do | 2.2 ohms. |
| 18 | 4″ speaker—Voice Coil Impedance | 3.2 ohms. |
| 141 | Volume Control, adjustable resistance. | |
| 142 | 12 Volt Output plug, input to amplifier | +. |
| 143 | 12 Volt Plug output from rectifier | −. |

A pump 55 is provided on the bottom surface of the casing 15. It is driven by conventional ⅒ H.P. capacitator start induction motor 56. The motor is provided with a shield 57 to protect the magnetic portions of the tape 30. The casing 59 of the pump is open at central inlet orifice 60 to the interior of the casing 11 and discharges the air sucked therefrom through an air-discharge opening 61.

The pump 55 develops a vacuum on the under side of the upper wall 27. This vacuum serves to hold the edges of the tape as 30 against the track surface 21 near the window 42 and cutting assembly 33 as well as adjacent to splicing tape sub-assembly 25.

Capacitator 58 for motor 56, solenoids 50 and 51, and amplifier 72 and components of the power circuit 71 are supported within casing 15 from roof 27.

A first series of ⅛″ inside diameter orifices 63, 64, and 65 pass entirely through the track surface 21 and are located in a line ¼″ on one side of the center line of the tape 26 when such tape is drawn between grooves 28 and 29. Orifice 64 is in the center of surface 21 and orifices 63 and 65 are each located ¾″ of either side of orifice 64. At a distance ¼″ on the other side of such center line similar ⅛″ inside diameter orifices 66, 67, and 68 are similarly located. These holes provide for holding each of the ends 81 and 82 of each of a piece of cut video tape as 30 and 31 in abutment to form a butt joint during the application of the splicing tape 26 over said ends.

The conventional video tape as 30 is made of a strong, flexible plastic backing 90, such as Mylar (trademark for Minnesota Mining and Manufacturing Company's polyester product also described in U.S. Patents 2,711,901 and 2,654,681) in any of several standard thicknesses, usually 1, 1½, or 2 mils, exclusive of the magnetic coating 91 thereon. Such coating is made of red ferric oxide particles (usually 1 micron long and ²⁄₁₀ micron in width) and binder. The tape has a central video track 92 of 1.82 inches width, an audio track 93 of 0.07″ width, and a guard band 94 therebetween of 0.02″ width. A guard band 95 of 0.01″ width separates the video track from the cue track 96 and the control track 97 is separated from the cue track by another guard band 98. The cue track is usually .020 inch wide and the control track is .045 inch wide. The control track is conventionally provided with field pulses each ¼″ apart from each other. The window 42 of the device of this invention is located to place the gap 73 directly below the control track 97 of such conventional tape so that the head 41 and its gap 73 will be sensitive to the presence of such field pulse on the control track.

The solenoids 50 and 51 vibrate the head 41 at a frequency of 60 cycles per second below the control track. The flat central plane 73A passes through the center of the gap 73 and is normal to the plane of the top surface of the tape 30 and normal to the length of said tape. The vibration of the head has an amplitude of .0006" in the preferred embodiment. This limited amplitude of oscillation fixes the location of the head gap 73 with respect to the usual .025" width of the usual vertical blanking interval as 201, 203, 205, and 207 on the video track 92 between video fields as 200, 202, 204, and 206 on the video tape with great accuracy inasmuch as the blanking interval and the field pulse occur at the same time, i.e., at the same longitudinal position or at longitudinal positions fixed in relation to each other on the tape 30.

Figure 10:
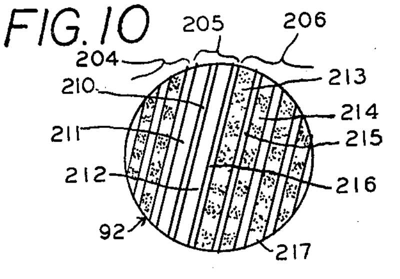
FIGURE 10 is an enlarged diagrammatic top view of tape 30 in zone 10A of FIGURE 8.

Further, the device of this invention fixes the location of the tape relative to the cutting blade 36 so that the edge 38 thereof cuts tape 30 in the center of a guard band, as 210, between the associated adjacent video tracks as 211 and 212 which, together, form a blanking interval, as 205, as shown in FIGURE 10. These guard bands are usually about 5.6 mils wide and the tracks are each 10 mils wide. The device of this invention thus provides sensing and signalling to locate the tape relative to the cutting edge of blade 36 with sufficient sensitivity to cut the tape through the center of a 5.6 mils wide guard band between the 10 mil wide video tracks of a blanking interval and so not to interfere with the pictures provided by the adjacent video fields. Such fields as 202, 204, and 206 are usually each composed of 16 transverse tracks, as 213 and 214, which tracks extend across the width of the video track of a tape as 30; such tracks are also 10 mils wide and have 5.6 mils wide guard bands as 215 therebetween. Other guard bands, as 216 separate such fields from the blanking intervals, as 205, and other bands as 215 extend between tracks as 214 and adjacent tracks as 217 in the video field. The width of the guard band is such as to prevent cross talk between the tracks. The preferred embodiment of this invention utilizes the conventional dimensions above described. However, it is to be understood that where smaller guard bands are used or different fixed distances between field pulses or blanking intervals are used it is within the scope of this invention that the distance between the center of oscillation of gap 73 and the cutting edge 80A of slot 80 may be varied so that a signal will be provided when the tape 30 is located so that cutting will occur through a guard band in the blanking interval as in the preferred embodiment.

The electromagnetic reaction of the oscillating head 41 with a field pulse as 74 actuates the amplifier 72 via the leads 110 and 11 with pulses at a frequency of 120 cycles per second: amplifier 72, a schematic wiring diagram of the preferred embodiment of which is shown in FIGURE 6, actuates the loud speaker 18 at such (120 c.p.s.) frequency. In the preferred embodiment the width of head gap is .0005" to obtain a sufficiently sharp electromagnetic reaction to locate the field pulse and the blanking interval on the tape with an accuracy of ±0.002 inch and so cut the guard band between the tracks in the blanking interval fairly in the center of such guard band.

Figure 8:
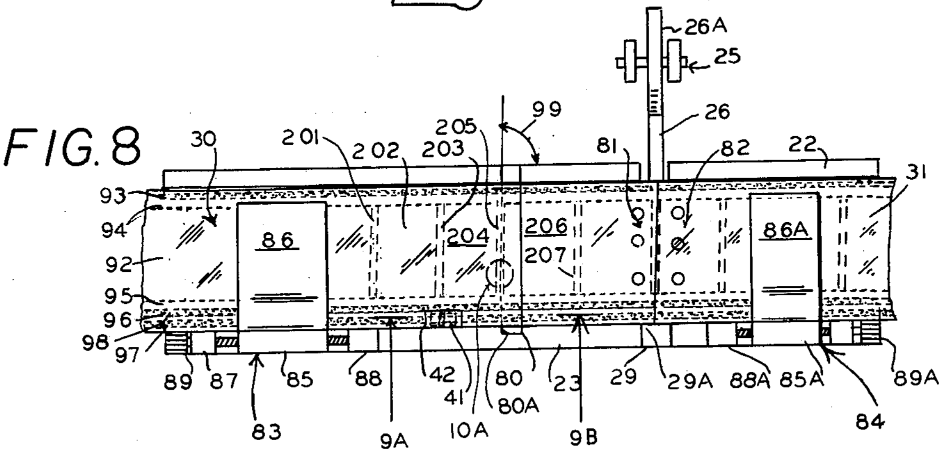
FIGURE 8 is an enlarged diagrammatic view of zone 8A of FIGURE 3 with cutting blade 36 in the position shown in FIGURE 1.
Figure 9:
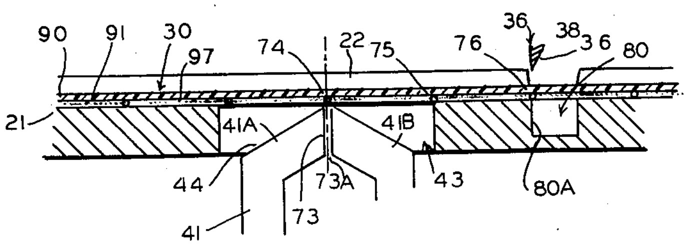
FIGURE 9 is a vertical cross-sectional view along plane 9A—9B of FIGURE 8.

The gap 73 is located, in the preferred embodiment, in the center of the ¾" long window 42. As shown in FIGURE 8, only that portion of the tape 30 which contains the field pulses passes over the gap 73. The field pulses, such as shown at 74, 75, and 76 diagrammatically in FIGURE 9, which ordinarily occur at 60 cycles per second at the normal operating speed of the tape for purpose of motor control, are spaced apart ¼" on the tape, as 30, along the length of the control track, 97, below described.

The location of the cutting blade 36 relative to the gap 73 along the length of track 21 is such that when a frame pulse as 74, 75, or 76 is located over the center of the oscillatory path of gap 73, during the vibration of the head 41, the amplifier 72 provides an amplification of about 100 decibels to actuate the loudspeaker 18.

Cutting slot 80 extends across track 21 and shoulders 22 and 23 at an angle, 99, which is 89°27' to the center of the track 21. The edge 80A of such cutting slot extends ¼" down and is ¼" wide and parallels the direction of the magnetic tracks as 213 and 214, and 211 and 212 on the tape 30. Cutting blade edge 38 slidably fits against and parallels edge 80A and the length of the blanking interval as 205 on the tape 30.

In the preferred embodiment the center of oscillation of plane 73A is 0.500±.002" away from the cutting edge 80A. This provides for the maximum audible signal to be produced by the loud speaker 18 when the center of a field pulse, as 76, and a blanking interval, as 205, are located directly over the cutting edge 80A in the track surface 21. The knife blade 36 cuts the tape in the center of the blanking interval and at an angle 99 of 89°27' to the longitudinal axis of the tape 30 and, accordingly, provides that such a tape is readily and conveniently and reliably cut through the center of a guard band in a blanking interval as 205 of said one piece of tape as 30 and such cut portion 81 may then be abutted to a similarly cut blanking interval at the end portion 82 of another tape 31 to which it is to be joined and without any observable television effect.

The vacuum holes 62, 63, 64, 65, and 66 serve to hold the cut edges as 81 and 82 of tapes 30 and 31 respectively onto the surface 21 of track 20. The surface of layer 91 containing magnetic material in the tape 30 is held down to surface 21 and so provides a greater sensitivity of the head 41 to the frame pulses in such surface.

This downward location of magnetized layer 91 provides that the splicing tape 26 may be readily and conveniently placed on layer 90 of tapes 30 and 31 to provide the least interference with the magnetic properties of the spliced tapes and with a minimum of manipulation of tapes which are to be spliced.

A rotatable tape adjustment rack sub-assembly 83 is located at one end of shoulder 23 of the track 20 and a similar tape adjustment rack sub-assembly 84 is provided at the other end for fine adjustment of the tape as 30 or 31 on track 20. Each rack, as 83 (and 84), comprises an ear as 85 (and 85A for rack 84) and an adjusting screw 89 (and 89A for rack 84). The lugs as 87 and 88 for each rack sub-assembly are elongated members firmly attached to the shoulder 23 and provided with a hole therethrough. Each ear as 85 and 85A is threaded for its adjusting screw and extends, in the preferred embodiment, for 2 inches length. The lugs 87 and 88 (and 87A and 88A for sub-assembly 84) are located 3 inches apart. A screw as 89 has a $\frac{1}{16}$" pitch and is rotatably but pivotally held in the lugs 87 and 88 and slidably and rotatably fits into the threaded hole in ear 85 (and 89A for ear 85A) and provides for motion of the plate 86 along the length axis of the track 20. Plate 86 is made of ⅛" sheet metal and is provided with a cushion 86A therebelow to prevent damage to the tape 30 while firmly moving it along track 20.

The racks (83 and 84) provide for controlled longitudinal motion as by thumb-screw 89 to pull (or to push) the tape, as 30, in order to readily and accurately obtain the position of the tape to obtain the maximum signal through the loud speaker 18 at any given setting of the amplifier and so locate most exactly the peak of the response of the apparatus and so most critically and exactly locate the tape for cutting through the vertical blanking interval as above described.

Figure 2:
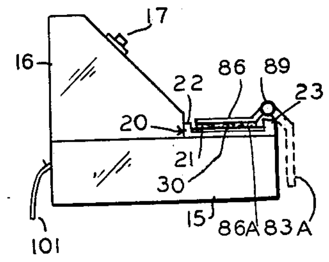
FIGURE 2 is a side view of the device of FIGURE 1.
Figure 3:
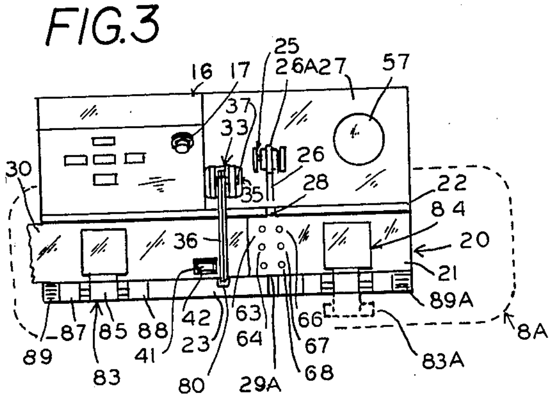
FIGURE 3 is a top view of the device of FIGUURE 1.

The rack sub-assembly 83 is rotatable about lugs 87 and 88 and the rack sub-assembly 84 is rotatable about lugs 87A and 88A to the position 83A shown in dotted lines in FIGURES 2 and 3, thus leaving track 20 clear for adding tape thereto or removing tape therefrom. The weight of the ⅛" thick x 1½" wide x 1½" long plate 86 is adequate to hold the tape in place therebelow without interfering with the sliding transport thereof along the track 20.

The device of this invention thus provides a vacuum to hold the ends of the tape firmly in position while the splicing tape is applied to the backing thereof. This is a big improvement over the methods wherein the ends are aligned backside down and are then raised so that the splicing tape may be slid underneath; by such procedures the ends may not fall back into their original position when loaded onto the splicing tape, resulting in a bad splice.

The suction from the blower 56 of this invention provides a force on the tape, as 30, to be cut and/or spliced to hold it in place and also aids in removing dust and dirt therefrom.

The electrical output from the head depends on the magnetic flux from the tape which falls between the poles 41A and 41B of the head 41. Such output will be constant so long as the tape and head are not moving relative to each other.

To make a splice the end 81 of tape 30 is moved slowly down the groove 21 pulling the tape, as 30, along track by rack 83 or 84 until a frame or field pulse, as 74, is located directly over the center of oscillation of plane 73A of gap 73 as above described. When the tone from the loud speaker is loudest, the tape is then in the correct position to be cut. Since the tape, as 30, needs only to be moved a maximum of ¼″ before one pulse, as 75, or the next, as 74, is reached, the tape is very readily aligned and cut in only a few seconds.

Next, the end 82 of the other piece of tape, as 31, to be spliced with the first tape 30 is aligned and cut in the same manner, pulled in the other direction. The cut ends 81 and 82 are then firmly abutted together halfway between the one line between the holes 63, 64, and 65, which are in one line perpendicular to the length of track 20, and the line between holes 66, 67, and 68, which holes are in a second line parallel to and spaced apart from the said one line by ½ inch. The ends are pressed firmly together and in line with the splicing tape holder. A strip of splicing tape 26 is then pulled out from a roll thereof, 26A, and over the tapes 30 and 31 and pressed down in place. The slight shoulder 28A and 28B on each side of the surface 21 near grooves 28 and 29 provides a guide for trimming the splicing tape close to the edges of the tapes, as 30 and 31, and the splice is completed.

More broadly the device of this invention also provides a sensing means 41 that—through circuits 71 and 72 and indicating means 18—produces an indication of the presence of magnetic flux, as in a field pulse present on magnetic storage medium, such as magnetic tape, with little or no physical movement of such medium. The sensing device is, according to this invention, of adjustable sensitivity to the distances on said medium occupied by said flux at any given speed of motion of said medium by varying the amplitude and/or speed of oscillation and/or gap width of the sensing device. The uniform motion of a medium, as 30, by the sub-assemblies as 83 or 84 past a head as 41 also gives an indication of the number of reversals of flux per unit length on said medium.

Although in accordance with the provision of the patent statutes, a particular preferred embodiment of this invention has been described in detail and the principles of the invention have been described in the best mode in which it is now contemplated applying such principles, it will be understood that the constructions shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claim.

I claim:

Cutting and splicing apparatus for video tape comprising video and control tracks, said video track comprising a series of video fields separated from each other by blanking intervals and the control track containing field pulses in a fixed relation to said blanking interval, comprising tape support and transport means for supporting and transporting such tape along a path, guide means at each side of said supporting means for guiding said tape along said path, sensing means sensitive to a field pulse on the control track of said tape when said field pulse is in a limited zone of a width substantially that of a blanking interval, said sensing means being located adjacent said tape support means in the zone of travel of said control track, indicating means operably connected to said sensing means, cutting means movably supported for movement to and from said tape supporting means, a cutting edge on said cutting means, said cutting edge in its operation passing through the zone of travel of said tape on said support means in a plane parallel to the blanking interval on said tape and located a full multiple of the length of the field pulse from the center of said limited zone, tape positioning means on said support and transport means maintaining said tape in contact with said support and transport means in the zone of said sensing means and in the zone of said cutting means, splicing tape dispensing means located adjacent said support means on the opposite side of said tape from said sensing element, and tape holding means on both sides of a line passing through said splicing tape dispensing means, said line being generally parallel to the length of said vertical blanking interval on said tape.

References Cited in the file of this patent

UNITED STATES PATENTS 3,037,073 Roizen ---------------- May 29, 1962